(12) United States Patent
Mao et al.

(10) Patent No.: US 10,274,040 B2
(45) Date of Patent: Apr. 30, 2019

(54) ACTIVE DAMPER FOR TORSIONAL VIBRATION AND NOISE MITIGATION IN A DRIVELINE

(71) Applicant: GM GLOBAL TECHNOLOGY OPERATIONS LLC, Detroit, MI (US)

(72) Inventors: Xiaofeng Mao, Novi, MI (US); Hai Xu, Northville, MI (US); Jeffrey N. Heaton, White Lake, MI (US); Scott C. Mrdeza, Lennon, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/481,040

(22) Filed: Apr. 6, 2017

(65) Prior Publication Data

US 2018/0291979 A1    Oct. 11, 2018

(51) Int. Cl.
| | | |
|---|---|---|
| *F16F 15/00* | (2006.01) |
| *F16F 15/02* | (2006.01) |
| *F16F 15/18* | (2006.01) |
| *F16F 15/023* | (2006.01) |
| *F16F 15/027* | (2006.01) |
| *F16F 15/173* | (2006.01) |

(52) U.S. Cl.
CPC ........ *F16F 15/002* (2013.01); *F16F 15/0235* (2013.01); *F16F 15/0275* (2013.01); *F16F 15/173* (2013.01); *F16F 15/18* (2013.01); *F16F 2222/06* (2013.01); *F16F 2222/08* (2013.01); *F16F 2222/12* (2013.01); *F16F 2224/043* (2013.01); *F16F 2224/045* (2013.01); *F16F 2228/04* (2013.01); *F16F 2230/183* (2013.01); *F16F 2232/02* (2013.01); *F16F 2236/08* (2013.01)

(58) Field of Classification Search
CPC ...... F16F 15/0235; F16F 15/173; F16F 15/18; F16F 2222/08; F16F 2230/183
See application file for complete search history.

(56) References Cited

U.S. PATENT DOCUMENTS 6,050,380 A * 4/2000 Peinemann ........... F16F 15/131
192/208
6,305,519 B1 * 10/2001 Katoh ................... F16D 35/023
192/58.682

(Continued)

*Primary Examiner* — Thomas J Williams
*Assistant Examiner* — James K Hsiao
(74) *Attorney, Agent, or Firm* — Cantor Colburn LLP

(57) ABSTRACT

An active damping system for a driveline includes a prop shaft configured to transmit engine power from an engine to a load, a sealed damper housing, and an active damping fluid contained within the sealed damper housing. A viscosity of the active damping fluid is changeable based on a torsional vibration of the prop shaft. The active damping system further includes a piston fixed to a side of the prop shaft and in communication with the active damping fluid. The piston is configured to rotate about an axis of the prop shaft. The system further includes a viscosity changing unit in communication with the active damping fluid, and a controller operatively connected to the viscosity changing unit. The controller is configured to cause the viscosity changing unit to change a viscosity of the active damping fluid. The viscosity of the active damping fluid changes the torsional vibration.

4 Claims, 2 Drawing Sheets

(56) References Cited

U.S. PATENT DOCUMENTS

| | | | | |
|---|---|---|---|---|
| 6,543,588 B1* | 4/2003 | Raad | ............ | B60L 7/00 |
| | | | | 180/65.22 |
| 8,075,410 B2* | 12/2011 | Carlson | ............ | F16F 15/162 |
| | | | | 464/24 |
| 8,303,422 B2* | 11/2012 | Freund | ............ | F16F 15/16 |
| | | | | 464/24 |
| 2006/0247065 A1* | 11/2006 | Bach | ............ | F16D 3/12 |
| | | | | 464/68.3 |
| 2009/0133529 A1* | 5/2009 | Kister | ............ | F16F 15/162 |
| | | | | 74/573.11 |
| 2010/0300820 A1* | 12/2010 | Carlson | ............ | F15B 11/17 |
| | | | | 188/290 |
| 2011/0169443 A1* | 7/2011 | Baker | ............ | H02P 23/04 |
| | | | | 318/807 |

* cited by examiner

ACTIVE DAMPER FOR TORSIONAL VIBRATION AND NOISE MITIGATION IN A DRIVELINE

INTRODUCTION

The subject disclosure relates to engine vibration dampers and more particularly to active mitigation of driveline prop shaft torsional vibration and noise.

In powertrains with rotating shafts or couplings, torsional vibrations can occur within and cause undesirable driveline noise. Torsional vibration can be introduced into a driveline by moving parts in the power source or coupling to the power source. In internal combustion engines, the torsional vibrations and noise can vary in intensity with changes in engine speed. This type of vibration can be caused by the intermittent firing in the engine cylinders. As the vehicle accelerates, the driveline shaft may experience a peak of vibrational intensity at a particular engine RPM or vehicle speed, then drop to normal vibratory or auditory levels past the peak frequency. Deceleration may cause a similar effect at the same or a different RPM or vehicle speed than the acceleration.

Tuned absorber-type dampers use a spring element (often rubber in automobile applications) and an inertia ring that is typically tuned to the first torsional natural frequency of the prop shaft. Rubber-based dampers can reduce the vibration at specific engine speeds or vehicle speeds when an excitation torque excites the first natural frequency of the prop shaft, but not at other speeds. Since some vehicles may have peak torsional resonant frequencies that vary with different driving scenarios, rubber dampers may be effective in one driving scenario (acceleration, for example) and may not be effective in another driving scenario (e.g., deceleration).

It is desirable to provide an active damper system that can be controlled in real-time to adjust for different damping characteristics so as to mitigate prop shaft torsional vibration and noise at all frequencies in all driving scenarios.

SUMMARY

In one exemplary embodiment, an active damping system for a driveline includes a prop shaft configured to transmit engine power from an engine to a load, a sealed damper housing surrounding a portion of the prop shaft, and an active damping fluid contained within the damper housing. A viscosity of the active damping fluid is changeable based on a torsional vibration of the prop shaft. The piston is configured to rotate about an axis of the prop shaft. The system further includes a viscosity changing unit in communication with the active damping fluid, and a controller operatively connected to the viscosity changing unit. The controller is configured to cause the viscosity changing unit to change a viscosity of the active damping fluid. The viscosity of the active damping fluid changes the damping effect and further torsional vibration.

In another exemplary embodiment, an active damping system for a driveline includes a prop shaft configured to transmit engine power from an engine to a load, a clutch gear concentric with the prop shaft and configured to communicate power from the prop shaft to a damping clutch assembly, an inertia gear in communication with the damping clutch assembly, a hydraulic actuator configured to communicate hydraulic force to the damping clutch assembly via the hydraulic fluid, and a controller operatively connected to the hydraulic actuator. The controller is configured to change a torsional vibration of the prop shaft by changing the hydraulic force acting on the damping clutch assembly.

In yet another exemplary embodiment, an active damping system for a driveline includes a prop shaft configured to transmit engine power from an engine to a load, a hydraulic actuator configured to communicate hydraulic force to the inertia gear via the hydraulic fluid, and a controller operatively connected to the hydraulic actuator. The controller is configured to change a torsional vibration of the prop shaft by altering a friction force on the inertial gear.

In addition to one or more of the features described herein, the active damping fluid is a magnetorheological fluid.

In another exemplary embodiment where the active damping fluid is a magnetorheological fluid, and the viscosity changing unit is an electromagnet configured to receive a control signal from the controller and change the viscosity of the active damping fluid in response to the control signal with an electromagnetic field.

In yet another exemplary embodiment the active damping fluid is an electrorheological (ER) fluid.

In an exemplary embodiment where the active damping fluid is an ER fluid, the viscosity changing unit is a current generator configured to receive a control signal from the controller, and configured to change the viscosity of the active damping fluid in response to the control signal.

In another exemplary embodiment where the active damping fluid is an ER fluid, the active damping system further includes one or more pistons rigidly fixed to a side of the prop shaft. The one or more pistons are configured to rotate about an axis of the prop shaft. The one or more pistons are in communication with the active damping fluid.

In yet another exemplary embodiment the controller is configured to determine a vehicle speed, and cause the viscosity changing unit to change a viscosity of the active damping fluid based on the vehicle speed.

In another exemplary embodiment, the controller is configured to determine an engine speed, and cause the viscosity changing unit to change a viscosity of the active damping fluid based on the engine speed.

In another exemplary embodiment, the viscosity changing unit is fixed to the prop shaft and configured to rotate with the prop shaft.

In yet another exemplary embodiment, the system includes a clutch gear, an inertia gear, and a hydraulic actuator. The hydraulic actuator is configured to receive a control signal from the controller, and change the torsional vibration of the prop shaft by changing the hydraulic force acting on the damping clutch assembly in response to the control signal.

In another exemplary embodiment that includes the hydraulic actuator, the controller is configured to determine a vehicle speed and cause the hydraulic actuator to altering the friction force on the inertial gear.

In yet another exemplary embodiment that includes the hydraulic actuator the controller is configured to determine an engine speed, and cause the hydraulic actuator to alter the friction force on the inertial gear.

In another exemplary embodiment that includes the hydraulic actuator, the damping system includes a non-rotary housing in which the clutch gear, the dynamic clutch assembly, and the inertia gear are mounted.

In yet another exemplary embodiment that includes the hydraulic actuator, the controller is configured to determine a vehicle speed and change the hydraulic force acting on the damping clutch assembly to change the torsional vibration of the prop shaft based on the vehicle speed.

In yet another exemplary embodiment that includes the hydraulic actuator, the controller is configured to determine an engine speed and change the hydraulic force acting on the damping clutch assembly to change the torsional vibration of the prop shaft based on the engine speed.

In yet another exemplary embodiment, the hydraulic actuator is configured to alter the torsional vibration of the prop shaft by changing the hydraulic force acting on one or more damping pads.

In another exemplary embodiment, the damping system includes a non-rotary housing in which the inertia gear and the one or more damping pads are mounted.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
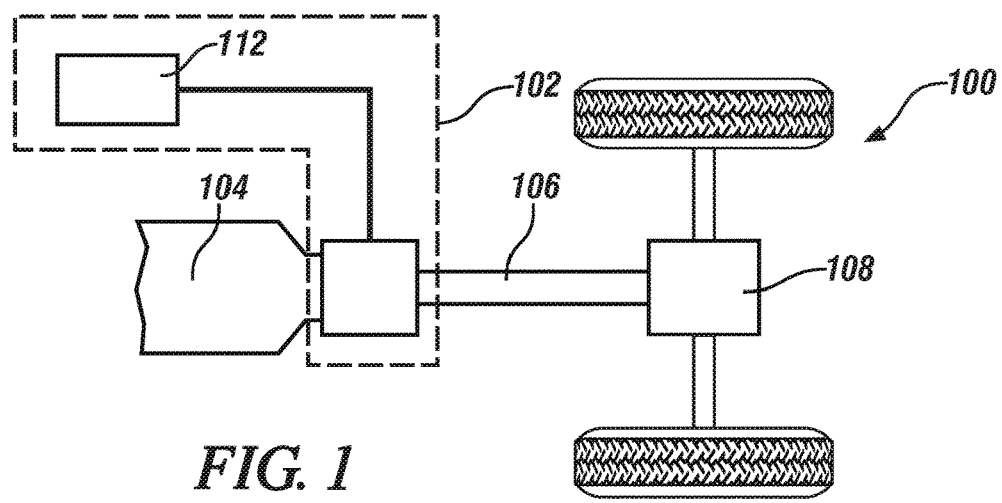
FIG. 1 is a diagram of a drive line of an exemplary vehicle having an active damping system according to one or more embodiments.

In accordance with an exemplary embodiment, FIG. 1 depicts a driveline in an exemplary vehicle 100 having an active damping system 102. Vehicle 100 may be, for example, an automobile having a power source/transmission 104. Power source/transmission 104 transmits power to a rear differential 108 via a prop shaft 106. Vehicle 100 is configured with active damping system 102 that can mitigate vehicle vibrations and noise resulting from torsional vibrations within prop shaft 106 as it rotates. Active damping system 102 actively adjusts to compensate for any number of resonant frequencies of vibration in prop shaft 106.

In vehicle drivelines with rotating shafts or couplings, torsional vibrations can occur within the rotating shaft. At certain frequencies the torsional vibrations can cause undesirable driveline noise introduced into the driveline by moving parts in the power source. According so tome embodiments, the power source/transmission 104 may be an internal combustion engine and a transmission. In internal combustion engines, the torsional vibrations and noise can vary in intensity with changes in engine speed (RPMs) or vehicle speed and with different driving scenarios such as acceleration and deceleration. Torsional vibration can be caused by the intermittent firing in the engine cylinders. As the vehicle accelerates, the driveline shaft may experience a peak of vibrational intensity at a particular engine RPM or vehicle speed, then drop to normal auditory levels past the peak frequency. Deceleration may cause a similar effect at the same or a different RPM or vehicle speed than the acceleration. Resonant frequencies of vibration may vary from vehicle to vehicle, and may also vary according to driving scenarios like acceleration and deceleration.

In some embodiments, power source/transmission 104 may be one or more electric motors. In vehicles with electromechanical drive systems, torsional vibrations can result from fluctuations of the rotational speed of the rotor of the driving electric motor (the power source). Oscillations of the angular speed superimposed on the average rotor rotational speed can cause varying perturbation of the electromagnetic flux and thus additional oscillations of the electric currents in the motor windings. Then, the generated electromagnetic torque is also affected by additional variable in time components which induce torsional vibrations of the drive system. Mechanical vibrations of the drive system may couple with the electrical vibrations of currents in the motor windings and create resonant frequencies of vibration that vary from vehicle to vehicle, and can vary with respect to driving scenarios like acceleration and deceleration.

Embodiments of active damping systems described herein can control and mitigate vibration noise in real-time by adopting different damping characteristics that mitigate prop shaft torsional vibrations and noise at multiple frequencies, and in varied driving scenarios. By mitigating or eliminating more than one frequency of resonance, the user experience can be enhanced by providing less noise and vibration while driving a vehicle having the active damping system.

Figure 2:
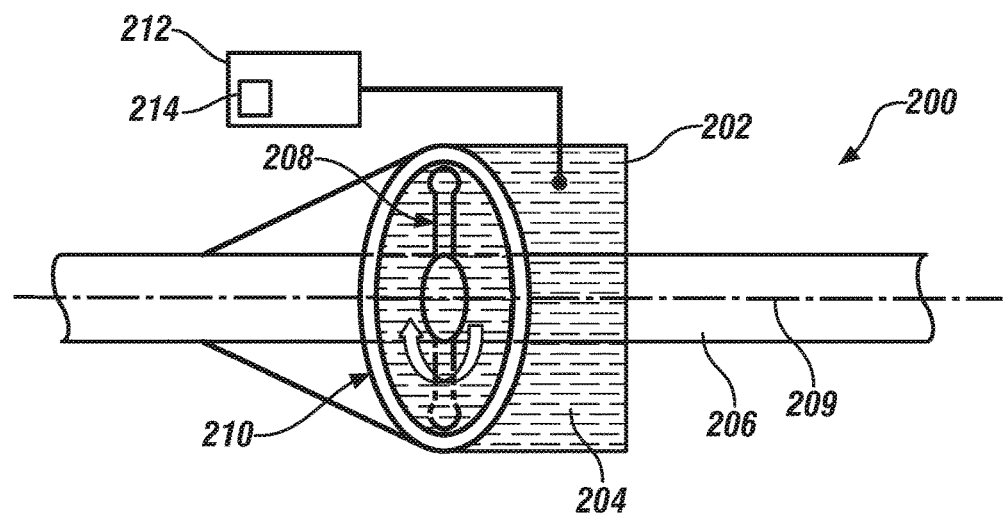
FIG. 2 is a diagram of an active damping system according to one embodiment.

In accordance with an exemplary embodiment, FIG. 2 depicts an active damping system 200 for a driveline of a vehicle (e.g., vehicle 100). Active damping system 200 can include a prop shaft 206 configured to transmit engine power from a power source and/or a transmission (such as, for example, power source and transmission 104 as depicted in FIG. 1). Active damping system 200 may further include a sealed housing 202, one or more pistons 208, a controller 212, and a viscosity changing unit 210. Sealed housing 202 is a non-rotary housing configured to contain an active damping fluid 204.

In one embodiment, active damping system 200 may include one or more pistons 208. For example, in one embodiment having a single piston, piston 208 can be a rod or other weighted protrusion fixed to a side of the prop shaft such that it may rotate about the prop shaft axis 209. Piston 208 is configured to rotate within housing 202 through active damping fluid 204. Rotation of piston 208 through active damping fluid 204 may maintain, speed up, or slow down rotation of prop shaft 206, which can be altered by controller 212 to vary the viscosity of the active damping fluid 204.

In another embodiment, active damping system 200 may include a plurality of pistons (the second of a plurality of pistons shown in phantom lines) that may be evenly/symmetrically distributed around the prop shaft to ensure pistons are balanced about prop shaft 206.

According to yet another embodiment, active damping system 200 may include a plate (not shown) configured to rotate about prop shaft axis 209 in place of the one or more pistons 208.

In yet another embodiment, active damping system 200 may include only active damping fluid 204 without the one or more pistons 208. Accordingly, active damping system 200 may create the damping effect by altering the viscosity of the active damping fluid 204 without a piston or plate rigidly fixed to prop shaft 206.

Active damping system 200 further includes a controller 212 operatively connected to viscosity changing unit 210. Controller 212 includes a processor 214 configured to, among other things, control viscosity changing unit 210 by transmitting one or more signals that cause viscosity changing unit 210 to change the viscosity of active damping fluid 204.

Viscosity changing unit 210 is configured to receive the signal(s) from a processor 214. The control signals can cause viscosity changing unit 210 to change a viscosity of the active damping fluid 204. As explained in greater detail hereafter, viscosity changing unit 210 may change the viscosity of the fluid by transmitting an electric or magnetic field of varying intensity to the active damping fluid 204. By changing the viscosity of the active damping fluid 204, active damping system 200 may change a torsional vibration in prop shaft 206 in real-time to reduce or eliminate torsional vibrations in prop shaft 206.

Housing 202 can include an active damping fluid 204 contained within housing 202. Active damping fluid 204 may be configured such that a viscosity of the active damping fluid is changeable by viscosity changing unit 210 based on torsional vibration of prop shaft 206. More particularly, when prop shaft 206 experiences torsional vibration exceeding a predetermined threshold, or falling beneath a predetermined threshold, or the prop shaft 206 rotates at certain frequencies in certain driving scenarios, controller 212 may change the viscosity of the active damping fluid 204 to counteract or interfere with the resonant frequency of vibration by altering a rotary velocity of prop shaft 206 in real-time.

Figure 4:
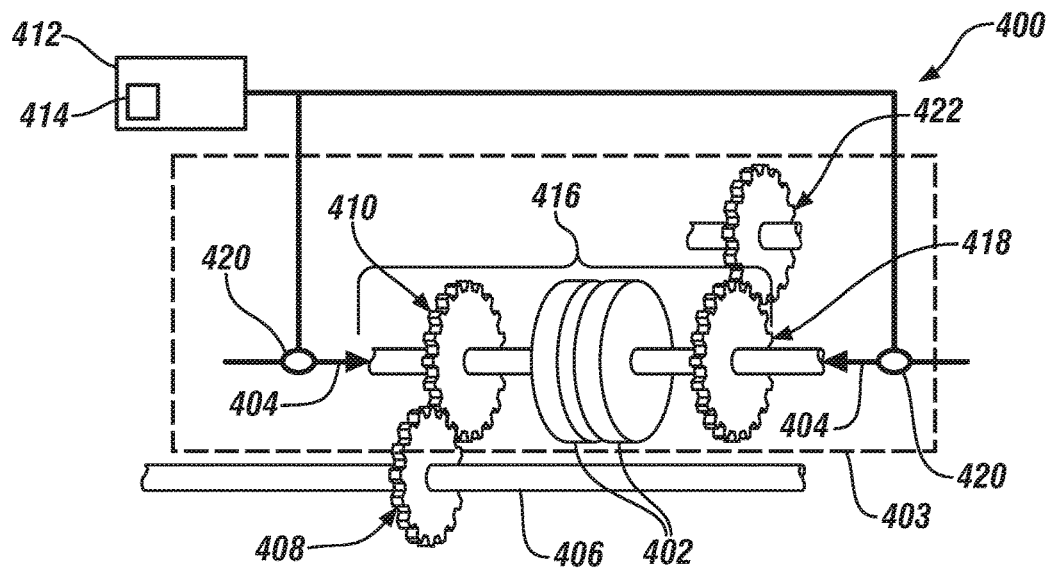
FIG. 4. is a diagram of an active damping system for active damping with a damping clutch according to one embodiment.
Figure 5:
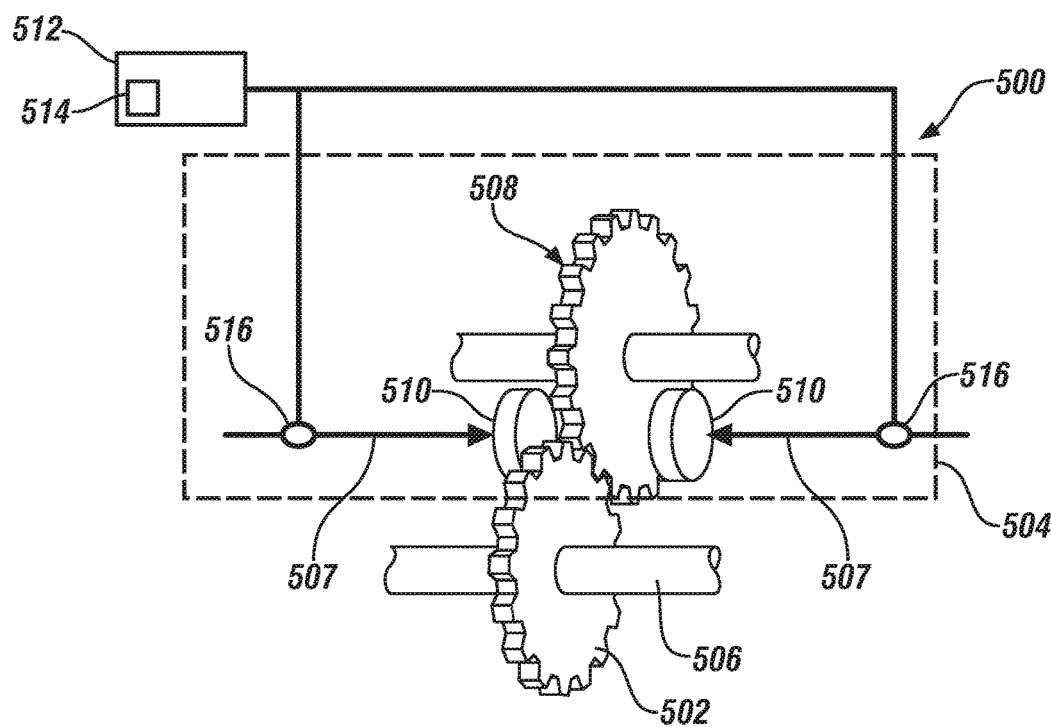
FIG. 5 is a diagram of an active damping system having a hydraulic actuator, an inertia gear, and damping pads according to one embodiment.

In some embodiments, the predetermined threshold is configured with respect to a particular vehicle design, motor type, etc. Vehicles can experience torsional vibration peaks that vary based on the engine type, configuration of mechanical linkages, etc. Thus vehicles having a static torsional vibration damping system (e.g., a rubber-based damper) are tuned for only one frequency of vibration (usually the most pronounced). However, multiple peaks of torsional vibration can be experienced by the vehicle, making static torsional vibration damping systems limited in their effect. According to embodiments described herein, active damping systems can actively change physical properties to accommodate the multiple frequencies by adjusting the viscosity of active damping fluid 204, or actively slow rotational velocity of system components (as depicted in FIGS. 4 and 5) according to predetermined criteria stored in a lookup table or other data storage mechanism. The predetermined criteria may be set in advance by experimentation with individual vehicle configurations to accommodate the multiple peak frequencies of vibrations for that vehicle. Each peak frequency may be anticipated by a processor of the system by monitoring engine speed, vehicle speed, etc.

According to one embodiment, active damping fluid 204 may be a magnetorheological (MR) fluid. When active damping fluid 204 is a MR fluid, viscosity changing unit 210 is configured as an electromagnet. MR fluid is a type of magnetically changeable fluid in a carrier such as, for example, a type of oil. When subjected to a magnetic field, the ER fluid increases its viscosity to the point of becoming a viscoelastic solid. The yield stress of the fluid when in its active ("on") state can be controlled by varying the magnetic field intensity produced by viscosity changing unit 210. According to one embodiment, when the active damping fluid 204 is a ER fluid, it may have a low viscosity in the absence of an applied magnetic field, but become quasi-solid with the application of a magnetic field. Accordingly, active damping fluid 204 may assume properties comparable to a solid when in the activated ("on") state, which can vary from a water-thin state in the "off" state to a point of yield (the shear stress above which shearing occurs). Yield stress (commonly referred to as apparent yield stress) is dependent on the magnetic field generated by viscosity changing unit 210 (configured as an electromagnet) when the magnetic field is applied to active damping fluid 204. When configured as a MR fluid, active damping fluid 204 may behave as a viscoelastic material, below the yield stress (in the activated or "on" state), with a complex modulus that is also known to be dependent on the magnetic field intensity.

Accordingly, viscosity changing unit 210 may receive a control signal from processor 214, and change the viscosity of the active damping fluid 204 in response to the control signal with an electromagnetic field. More particularly, viscosity changing unit 210 may generate an electromagnetic field to either thicken or thin active damping fluid 204 by changing the viscosity.

In accordance with another embodiment, active damping fluid 204 can be configured as an electrorheological (ER) fluid. When active damping fluid 204 is an ER fluid, viscosity changing unit 210 is configured to change an electric field passing through active damping fluid 204. ER fluids are suspensions of extremely fine non-conducting but electrically active particles (up to 50 micrometers diameter) in an electrically insulating fluid (such as, for example, silicone oil). Without a field (e.g., a "no-field" condition) most ER fluids are Newtonian. No-field viscosity is an important consideration in many applications, since it determines the minimum torque (or pressure) that the device or mechanism interacting with the ER fluid can produce under given conditions, just as the yield stress determines the maximum. The variation of no-field viscosity with temperature may be similar to that of pure oil, according to one embodiment. When configured as an ER fluid, the apparent viscosity of active damping fluid 204 changes reversibly by an order of up to 100,000 in response to an electric field generated by viscosity changing unit 210. For example, when configured as an ER fluid, active damping fluid 204 can go from the consistency of a thin oil (no-field condition) to that of a gel (in a high-intensity field) and back, with response times on the order of milliseconds.

According to one embodiment, viscosity changing unit 210 may receive a control signal from controller 212, and change the viscosity of active damping fluid 204 in response to the control signal. In some aspects, viscosity changing unit 210 may increase or decrease an electric field proximate to active damping fluid 204.

Controller 212 may be configured to dampen torsional vibration in prop shaft 206 based on vehicle speed. For example, in one embodiment, processor 214 may determine a vehicle speed, and cause the viscosity changing unit 210 to change a viscosity of the active damping fluid 204 based on the vehicle speed. Although not shown in FIG. 2, it should be appreciated that controller 212 may be operatively connected to one or more other controllers in vehicle 100 that can provide information indicative of vehicle speed or engine revolutions per minute (RPM).

In another embodiment, controller 212 may be configured to dampen torsional vibration in prop shaft 206 based on engine RPM. For example, controller 212 may determine an engine speed, and cause the viscosity changing unit to change a viscosity of the active damping fluid based on the engine speed.

In another embodiment, controller 212 may be configured to dampen torsional vibration in prop shaft 206 based on one or more values stored in a computer-readable memory of controller 212 (not shown in FIG. 2) associated with a particular engine speed or vehicle speed. For example, controller 212 may determine an engine speed, determine one or more settings, voltages, magnetic flux values, etc. based on the engine or vehicle speed that will mitigate or eliminate an unwanted torsional vibration, and cause the viscosity changing unit to change a viscosity of the active damping fluid based on the engine speed to affect the vibration.

Figure 3:
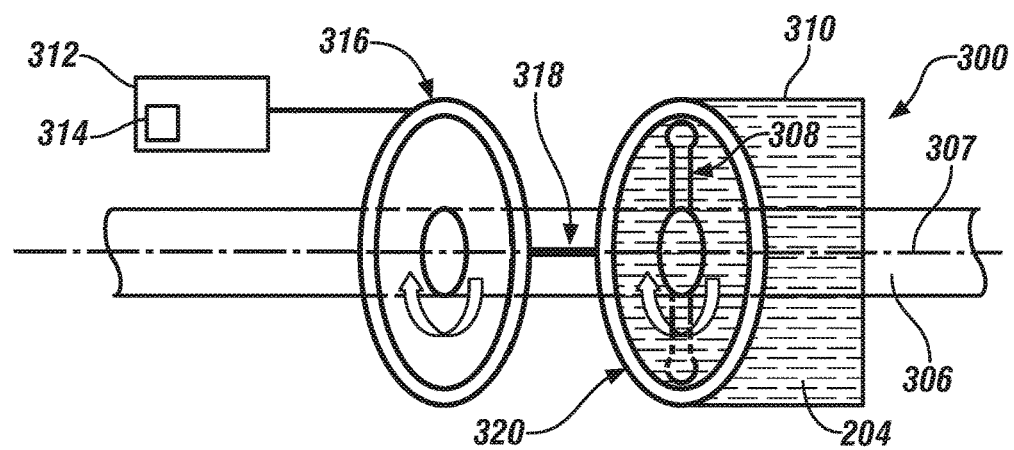
FIG. 3 is a diagram of an active damping system having a viscosity changing unit configured to rotate with a prop shaft according to one embodiment.

In accordance with another exemplary embodiment, FIG. 3 depicts a diagram of an active damping system 300 for a driveline. Active damping system 300 may be configured to include a sealed housing 310 rigidly fixed to a prop shaft 306. One benefit of allowing housing 310 to be rigidly fixed to, and rotate with, prop shaft 306 is that active damping system 300 may be located at a wider range of positions along the driveline. Prop shaft 306 is configured to transmit engine power from a power source and/or a transmission (such as, for example, power source and transmission 104 as depicted in FIG. 1). Active damping system 300 may further include one or more pistons 308 configured in housing 310, a controller 312, and a viscosity changing unit 320. Sealed housing 310 is configured to contain an active damping fluid 204.

According to one embodiment, viscosity changing unit 320 is configured to rotate with prop shaft 306 and receive power from controller 312 via a power cable 318 that rotates with prop shaft 306. Viscosity changing unit can be configured to connect to controller 312 (and processor 314) via a slip ring 316 that is configured to provide electrical connectivity to viscosity changing unit 320 when it is spinning about an axis 307 of prop shaft 306.

Shear can be described as the normal force resisting movement of piston 308 in active damping fluid 204 (or vice versa). The greater the viscosity of active damping fluid 204, the greater the shear force. As the change in velocity with respect to both of the one or more pistons 308 and active damping fluid 204 increases, so does the shear force acting on the fluid. According to one embodiment, the housing 310 is rigidly connected to prop shaft 306 and is configured to rotate with prop shaft 306. Piston 308 is configured to move through active damping fluid 204. As the crank rotates, changes in momentum of piston(s) 308 (during acceleration and deceleration) create shear force in damping fluid 204, which may be actively controlled by changing the viscosity of active damping fluid 204. As vehicle 100 accelerates or decelerates, the harmonics may oscillate housing 310. The oscillation energy is converted to thermal energy via shear force of the pistons deforming damping fluid 204, and the thermal energy in active damping fluid 204. The heat is dissipated through housing 310 to atmosphere.

Similar to active damping system 200, viscosity changing unit 320 may be configured to generate a magnetic field or pass an electric field directly to active damping fluid 204. Accordingly, controller 312 causes active damping fluid 204 to change viscosity. Active damping fluid 204 deforms within active damper housing 310 as piston 308 rotates inside of the housing. As active damping fluid 204 thickens or thins, the fluid experiences a change in rotational momentum. The difference in these two rotational speeds (of the piston 308 and the active damping fluid 204) is the amount of energy that is being put into active damping fluid 204. The fluid experiences a shear force that opposes the harmonics in prop shaft 306 and dissipates the harmonic energy in prop shaft 306 as heat.

In accordance with another exemplary embodiment, FIG. 4 depicts an active damping system 400 for active damping with a damping clutch assembly 416. Active damping system 400 includes a prop shaft 406 configured to transmit engine power from an engine and/or transmission (not shown) to a load (not shown), a clutch gear 408 concentric with prop shaft 406, a damping clutch assembly 416, an inertia gear 422, and one or more hydraulic actuator(s) 420. Active damping system 400 may further include a non-rotating housing 403 in which the inertia gear 422 and other components are mounted.

Hydraulic actuator(s) 420 may be, for example, one or more hydraulic cylinders or other mechanism configured to provide force via a unidirectional stroke, coupled with one or more hydraulic motors configured to provide power to the cylinders.

Instead of actively changing a viscosity of a fluid surrounding a spinning piston as in FIGS. 1-3, active damping system 400 is configured to actively dampen vibration by communicating a hydraulic force 404 via hydraulic actuator(s) 420. Controller 412 causes, via processor 414, hydraulic actuator(s) 420 to communicate the hydraulic force 404 to the damping clutch assembly 416 and push clutch plates 402 together with a varying force.

Controller 412 may vary the hydraulic force 404 applied to clutch plates 402 to achieve a particular damping affect. The hydraulic force 404 applied varies based one or more values stored in a computer-readable memory (not shown, but included in one or more controllers 112, 212, 312, 412, and 512) associated with a particular engine speed or vehicle speed. For example, controller 412 may determine an engine speed, determine one or more settings, voltages, magnetic flux values, etc. based on the engine or vehicle speed, and cause hydraulic actuator(s) 420 to change a hydraulic force applied to the damping clutch assembly based on the engine speed. In some aspects, the clutch plates 402 may be fully open (having no hydraulic force applied to damping clutch assembly 416) to mitigate vibration on one peak frequency of vibration. According to other aspects, other peak frequencies of vibration may be mitigated through varying levels of clutch plate 402 engagement by applying, via controller 412, hydraulic force at damping clutch assembly 416. Accordingly, controller 412 is configured to alter hydraulic force and further a rotational speed of the inertia gear 422 via the damping clutch assembly 416, which can change a torsional vibration of the prop shaft 406. In some aspects, clutch gear 418 can receive the harmonic energy in prop shaft 306 and dissipate the energy received via clutch plates 402 to inertia gear 422.

According to one embodiment, controller 412 is configured to determine a vehicle speed and cause the hydraulic actuator(s) 420 to alter the hydraulic force and further the rotational speed of the inertia gear 422 based on the vehicle 100 speed.

In accordance with an another exemplary embodiment, FIG. 5 depicts an active damping system 500 having a prop shaft 506 rigidly connected to a clutch gear 502, an inertia gear 508 in communication with clutch gear 502, one or more damping pads 510 in communication with inertia gear 508, and one or more hydraulic actuators 516 configured to apply hydraulic force 507 to the one or more damping pads 510. Active damping system 500 may further include a non-rotary housing 504 in which the inertia gear 508 and the one or more damping pads 510 are mounted. Active damping system includes a controller 512 having one or more processors 514.

In some aspects, the embodiment depicted in FIG. 5 can determine, via processor 514, a vehicle speed, and altering the rotational speed of the inertia gear 508 via the one or more hydraulic actuators 516 based on the vehicle speed. In other aspects, controller 512 may alter the hydraulic force acting on damping pads 510, and further the rotational speed of the inertia gear 508, via the one or more hydraulic actuators 516 based on the engine speed or vehicle speed. Hydraulic actuator 516 can be configured to alter the rotational speed of the inertia gear 508 by applying hydraulic force 507 to one or more damping pads 510.

Embodiments of the present disclosure may provide for an active damper system that is controllable in real-time by a system controller, which may mitigate prop shaft torsional vibration and noise at all operational frequencies in all driving scenarios. Accordingly, user experience can be improved with reduced driving vibration and noise.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the disclosure not be limited to the particular embodiments disclosed, but will include all embodiments falling within the scope thereof.

What is claimed is:

1. An active damping system for a driveline comprising:
a prop shaft configured to transmit engine power from an engine to a load;
a hydraulic actuator configured to communicate hydraulic force to an inertia gear via a hydraulic fluid acting on one or more damping pads; and
a controller operatively connected to the hydraulic actuator, wherein the controller is configured to change a torsional vibration of the prop shaft by altering a rotational speed of the inertia gear.

2. The active damping system of claim 1, wherein the controller is configured to:
determine a vehicle speed; and
alter the rotational speed of the inertia gear via the hydraulic actuator based on the vehicle speed.

3. The active damping system of claim 1, wherein the controller is configured to:
determine an engine speed; and
alter the rotational speed of the inertia gear via the hydraulic actuator based on the engine speed.

4. The active damping system of claim 1, further comprising a non-rotary housing in which the inertia gear and the one or more damping pads are mounted.

* * * * *